United States Patent Office 3,268,544
Patented August 23, 1966

3,268,544
PREPARATION OF 2-OXAZOLINES AND
2-THIAZOLINES
Grant Thompson and Rogers F. Lambert, Brigham City,
Utah, assignors to Thiokol Chemical Corporation,
Bristol, Pa., a corporation of Delaware
No Drawing. Filed Nov. 12, 1964, Ser. No. 410,776
6 Claims. (Cl. 260—306.7)

This invention concerns the preparation of certain nitrogen containing heterocyclics.

More particularly, this invention relates to a thermal process for preparing 2-oxazolines and 2-thiazolines.

Many of the 2-oxazolines and thiazolines are known compounds. The 2-oxazolines have utility as pharmaceutical intermediates as well as local anesthetics. For pharmaceutical applications, it is critical that the compositions be prepared in a high state of purity in an anhydrous form.

Presently, the favored method of preparing the oxazolines is through the dehydration of certain Beta hydroxy amines and the corresponding amides. The generic preparation from B-hydroxamides is shown below:

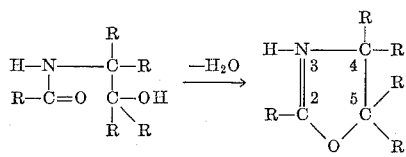

Unfortunately, many of the 2-oxazolines and the corresponding thiazolines, particularly those of low molecular weight are water soluble, and because of this the products are difficult to prepare in the anhydrous state using thermal dehydration. Furthermore when the water released during the reaction is removed by distillation the less volatile contaminants such as salts, which are contributed by the starting material, are concentrated during distillation. To avoid this purification problem dehydrating agents have been used to remove the water rather than heat. However, most of these agents are acidic in nature and produce the product in the form of a salt. This requires an additional step to produce the product in the free state. Because of these difficulties in the prior art method, an improved process for preparing 2-oxazolines and 2-thiazolines would be desirable. Ideally, the preparative process would produce the products in the free state, free of water and metallic contaminants, from readily available starting materials under relatively mild reaction conditions. A process with these attributes would be a substantial advance in the art.

Thus it is an object of this invention, among others, to directly prepare oxazolines and thiazolines in good yield.

A further object of this invention is to prepare the above products in the anhydrous state in the form of their free bases.

Additional objects of this invention are the preparation of the above products from readily available starting materials free from contaminants and impurities.

Other objects will become obvious to those skilled in the art after a more thorough perusal of this application.

The objects described above among others, are accomplished by the thermal process described below.

In practice, an organic acid reactant saturated or unsaturated is reacted with a aziridinyl phosphine oxide or aziridinyl phosphine sulfide to form the adduct mixture which is then thermally decomposed in situ after stripping off excess solvent.

The preferred process is set forth below:

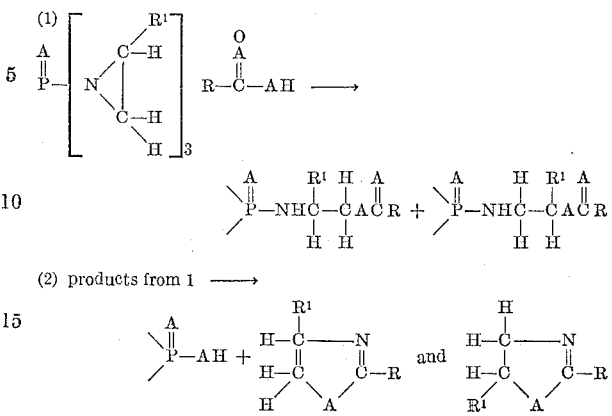

wherein R is selected from the group consisting of ethyl, propyl, isopropyl and phenyl radicals, $R^1$ is selected from the group consisting of hydrogen, methyl, cyclohexyl, phenyl and chlorinated phenyl, and A is selected from the group consisting of oxygen and sulfur.

The following azinidinyl sulfides and oxides represent only a partial listing of the satisfactory azirdinyl reactants which can be used:

tris(2-tert-butyl-1-aziridinyl)phosphine sulfide,
tris(2,3-didodecyl-1-aziridinyl)phosphine sulfide,
tris(2-ethyl-3-pentadecyl-1-aziridinyl)phosphine sulfide,
tris(2-eicosyl-1-aziridinyl)phosphine sulfide,
tris(2-methyl-3-cyclohexyl-1-aziridinyl)phosphine sulfide,
tris(2-phenyl-1-aziridinyl)phosphine sulfide,
tris(2-phenyl-3-benzyl-1-aziridinyl)phosphine sulfide,
tris(2,3-diphenyl-1-aziridinyl)phosphine sulfide,
tris(2-ethyl-3-phenyl-1-aziridinyl)phosphine sulfide,
tris(2-amyl-3-benzyl-1-aziridinyl)phosphine sufide,
tris(1-aziridinyl)phosphine oxide,
tris(2-methyl-1-aziridinyl)phosphine oxide,
tris(2,3-dimethyl-1-aziridinyl)phosphine oxide,
tris(2-isopropyl-1-aziridinyl)phosphine oxide,
tris(2-methyl-3-ethyl-1-aziridinyl)phosphine oxide,
tris(2-isopropyl-1-aziridinyl)phosphine oxide,
tris(2-methyl-3-n-butyl-1-aziridinyl)phosphine oxide,
tris(2-hexyl-1-aziridinyl)phosphine oxide,
tris(2,3-diheptyl-1-aziridinyl)phosphine oxide,
tris(2-methyl-3-octyl-1-aziridinyl)phosphine oxide,
tris(2-ethyl-3-decyl-1-aziridinyl)phosphine oxide,
tris(2-dodecyl-1-aziridinyl)phosphine oxide,
tris(2-methyl-3-tridecyl-1-aziridinyl)phosphine oxide,
tris(2-ethyl-3-octadecyl-1-aziridinyl)phosphine oxide,
tris(2-eicosyl-1-aziridinyl)phosphine oxide,
tris(2-methyl-3-cyclopentyl-1-aziridinyl)phosphine oxide,
tris(2-ethyl-3-cyclohexyl-1-aziridinyl)phosphine oxide,
tris(2-n-butyl-3-(4-methylcyclohexyl)1-aziridinyl)phosphine oxide,
tris(2-phenyl-1-aziridinyl)phosphine oxide,
tris(2-phenyl-3-tetradecyl-1-aziridinyl)phosphine oxide,
tris(2,3,-diphenyl-1-aziridinyl)phosphine oxide,
tris(2-tert-butyl-3-phenyl-1-aziridinyl)phosphine oxide,
tris(2-ethyl-3-(1-naphthyl)1-aziridinyl)phosphine oxide,
tris(2-n-propyl-3-(2-naphthyl)1-aziridinyl)phosphine oxide,
tris(2-methyl-3-benzyl-1-aziridinyl)phosphine oxide,
tris(2-n-propyl-3-(2-phenylethyl)1-aziridinyl)phosphine oxide,
tris(2-methyl-3-(4-methylphenyl)1-aziridinyl)phosphine oxide,
tris(2-ethyl-3-(3-n-propylphenyl)1-aziridinyl)phosphine oxide, tris(2-heptyl-3-(2,4-dimethylphenyl)1-aziridinyl)phosphine oxide,
tris(1-aziridinyl)phosphine sulfide,
tris(2-methyl-1-aziridinyl)phosphine sulfide,
tris(2,3-dimethyl-1-aziridinyl)phosphine sulfide,
tris(2,3-diethyl-1-aziridinyl)phosphine sulfide,
tris(2-methyl-3-isopropyl-1-aziridinyl)phosphine sulfide.

The organic acid reactants of this invention can be saturated or unsaturated and of diverse structure and origin. For example, aliphatic and aromatic carboxylic acids included within the formula

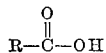

wherein R is selected from the group consisting of hydrogen, aliphatic and aromatic radicals, saturated or unsaturated, are satisfactory reactants. Illustrative saturated aliphatic carboxylic acids include among others, acetic, propionic, butyric, pentanoic, and hexanoic acids, straight chain or branched chain. Illustrative unsaturated aliphatic carboxylic acid reactants are acrylic, unadecylenic, crotonic, and the like. Typical of the saturated aromatic carboxylic acids which can be used are the benzoic acids, the toluic acids, the xylic acids and the higher homologues of these acids both substituted and unsubstituted. Among the many unsaturated aromatic carboxylic acids which can be used are phenylacrylic acid, phenyl-crotonic acid and the like.

As indicated previously the corresponding "thioacids" can be used as the organic acid reactants instead of the carboxylic acids. These reactants are selected from the groups of acids included within the formulas

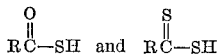

wherein R is selected from the group consisting of hydrogen, aliphatic and aromatic radicals, saturated or unsaturated.

Typical of these "thioacid" reactants are saturated thioacids having the formula: $CH_3COSH$, $C_2H_5COSH$,

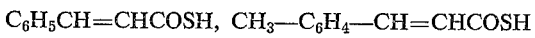

and $C_6H_5CSSH$ among many others.

The first step of the reaction (the formation of the adduct precursor) is generally carried out in the presence of an inert solvent such as benzene, petroleum ether, toluene, xylene, chlorobenzene, etc., at temperatures ranging from about 50° C. to about 200° C. However, the preferred temperature range is from about 90° C. to about 120° C. which is the reflux temperature of a good many inert aromatic solvents. The first step is carried out most conveniently at atmospheric pressure or near atmospheric pressure, but higher pressures can be used if desired. However, little apparent advantage accrues from the use of higher pressures and since their use increases equipment costs and operating hazards they are not commonly employed.

The preferred ratio of starting materials is about 1.1 equivalents of acid reactant for each equivalent of aziridine reactant used. This ratio is far from critical and fair results have been obtained when this ratio is increased or decreased by as much as 40%. The reaction time for the formation of the adduct usually varies between 1–24 hours with 4–8 hours being more typical.

The second step of the inventive process is most conveniently carried out after stripping off the inert solvent from the aziridinyl adduct intermediate. The actual decomposition of the product is preferably carried out under reduced pressures of 10 mm. of mercury or less at temperatures ranging from about 170–300° C. The temperature employed varies according to the reactants used or whether a catalyst is employed. It has been found that when certain acidic catalysts (such as the salts formed by reacting weak bases and strong acids, or the strong acids themselves) are incorporated into the adduct reaction mixture, decomposition proceeds more quickly at lower temperatures. For example, when 5% by weight (based upon weight of adduct) of a catalyst such as ammonium perchlorate, ammonium sulfate, ammonium chloride, perchloric acid, sulfuric acid, etc. is employed the decomposition temperature will be lowered, ordinarily to between 120°–150° C. The decomposition time will generally vary between 15 minutes to 2 hours depending upon the nature of the adduct, the temperature employed and whether a catalyst is employed. The products (oxazoline or thiazoline) are usually collected in a cooled receiver and purified by distillation or crystallization.

Example 1

In one embodiment of this invention, forty-two (42) parts of tris 1-(2-phenyl) aziridinyl phosphine oxide is dissolved in excess toluene and the mixture heated to reflux temperature. Twenty-six (26) parts of n-butyric acid are added slowly and the heating continued for nine hours. The solvent is removed by distillation. The residue was then heated for 30 minutes at 190° C. under 0.05 mm. pressure, and the oxazoline product collected in a cooled receiver. A product mixture of 2-propyl-5-phenyl-2-oxazoline and 65% 2-propyl-4-phenyl-2-oxazoline is obtained.

Example 2

In another embodiment, fifty-two (52) parts of tris 1-(2-chlorophenyl) aziridinyl phosphine sulfide and twenty-five (25) parts of n-butyric acid are dissolved in excess benzene, and the mixture heated at reflux for 12 hours. The benzene is distilled off and the residue was heated at 220° C. for one hour at 0.05 mm. pressure. The product, 66% 2-propyl-4-chlorophenyl-2-oxazoline and 40% 2-propyl-5-chlorphenyl-2-oxazoline, is collected in a cooled receiver.

Example 3

In yet another embodiment, a solution of forty-five (45) parts tris (1-(2-cyclohexyl) aziridinyl) phosphine oxide and twenty-seven (27) parts butyric acid in 200 parts toluene was heated at reflux temperature for five hours. The solvent was removed and the residual oil heated at 200° for thirty minutes under vacuum. The product is a mixture of 2-propyl-5-cyclohexyl-2-oxazoline and 2-propyl-4-cyclohexyl-2-oxazoline.

Example 4

In still a further embodiment, twenty-one (21) parts of tris (1-2-methyl) aziridinyl) phosphine oxide and twenty-six (26) parts of benzoic acid are dissolved in 300 parts of benzene, and the mixture is heated at reflux for 12 hours. The benzene is removed, and the residue is heated at 220° C. for one hour at 2 mm. pressure. The product, 2-phenyl-4-methyl-2-oxazoline and 2-phenyl-5-methyl-2-oxazoline is produced in good yield.

Example 5

In one embodiment of this invention, 4.2 parts of tris (1-(2-phenyl) aziridinyl) phosphine oxide is dissolved in excess toluene and the mixture heated to reflux temperature. A 3.0 portion of $NC_3H_7$—COSH is added slowly and the heating continued for nine hours. The solvent is removed by distillation. The residue was then heated for 40 minutes at 200° C. under 0.05 mm. pressure, and the thiazoline product collected in a cooled receiver. A product mixture of 2-propyl-5-phenyl-2-thiazoline and 2-propyl-4-phenyl-2-thiazoline is obtained.

Example 6

In another embodiment, 5.2 parts of tris (1-(2-chlorophenyl) aziridinyl) phosphine sulfide and 2.5 parts of $NC_3H_7COSH$ is dissolved in excess benzene, and the mixture heated at reflux for 15 hours. The benzene is distilled off and the residue was heated at 210° C. for one hour at 0.05 mm. pressure. The products, 2-propyl-4-chlorophenyl-2-thiazoline and 2-propyl-5-chlorophenyl-2-thiazoline are collected in a cooled receiver.

Example 7

In still another embodiment tris (1-(2-methyl) aziridinyl) phosphine oxide (3.5 parts by weight) and 1.5 parts of $C_2H_5COSH$ are refluxed with excess toluene for 15 hours. The solvent is stripped off and the residue heated under vacuum (0.05 mm.) at 210° C. for thirty minutes. The products obtained are a mixture of 2-ethyl-5-methyl-and 2-ethyl-4-methyl-2 thiazoline and are produced in good yield.

Example 8

In yet another embodiment, a solution of 4.5 parts tris (1-(2-cyclohexyl) aziridinyl) phosphine oxide and 2.7 parts $NC_3H_7CS_2H$ in 200 parts toluene are heated at reflux temperature for five hours. The solvent was removed and the residual oil heated at 200° C. for thirty minutes under vacuum. The product is a mixture of 2-propyl-5-cyclohexyl-2-thiazoline and 2-propyl-4-cyclohexyl-2-thiazoline.

Example 9

Twenty-one (21) parts of tris (1-(2-methyl) aziridinyl) phosphine oxide are dissolved in 300 parts toluene and the mixture is heated to reflux temperature. Twenty-six (26) parts of butyric acid are added slowly and the heating continued for nine hours. The solvent is removed by distillation. The residue is then heated for 30 minutes at 190° C. under 1 mm. pressure, and the oxazoline product is collected in a Dry Ice cooled receiver. The yield is 66%. Analysis by gas chromatography shows the product to be a mixture of 35% 2-propyl-5-methyl-2-oxazoline and 65% 2-propyl-4-methyl-2-oxazoline.

When 5% of an acid catalyst is added to the aziridine-butyric acid adduct, the oxazolines are formed rapidly at 130°–140° C. rather than at 190° C. as described above. The yield and product composition is essentially the same in the catalysed as in the uncatalysed reactions. The run is repeated using 5% by weight of the following catalysts: ammonium chloride, ammonium perchlorate, sulfuric acid, phosphoric acid and P-toluenesulfuric acid. In each instance the same products are obtained, and the products are formed at 130–140° C.

Example 10

Twenty-one (21) parts of tris (1-(2-methyl) aziridinyl) phosphine oxide and 26 parts of iso-butyric acid are dissolved in 300 parts of benzene, and the mixture heated at reflux for 12 hours. The benzene is then removed by distillation and the residue are heated at 220° C. for one hour at 2 mm. pressure. The product is collected in a Dry Ice cooled receiver. The yield is 66% 2-isopropyl-4-methyl-2-oxazoline and 40% 2-isopropyl-5-methyl-2-oxazoline.

Example 11

Twenty (20) parts of tris-aziridinylphosphine oxide and 26 parts of butyric acid are placed in 300 parts toluene and the solution is heated at reflux temperature for ten hours. The solvent is then removed and the residue is heated under vacuum (0.05 mm.) at 210° C. for thirty minutes. The product is collected in a cold trap. The product, 2-propyl-2-oxazoline, is obtained in a yield of 55%.

Example 12

A solution of 23 parts tris (1-(2-methyl) aziridinyl) phosphine sulfide and 27 parts butyric acid in 200 parts toluene are heated at reflux temperature for five hours. The solvent is removed and the residual oil heated at 200° for thirty minutes under vacuum. The product is collected in a Dry Ice cooled receiver and is then purified by distillation. The product distilled at 70°–75° C. (20 mm.). The yield is 50%. Analysis of the product by gas chromatograph showed it to be a mixture containing 60% 2-propyl-4-methyl-2-oxazoline and 40% 2-propyl-5-methyl-2-oxazoline.

As the foregoing examples and embodiments indicate, numerous changes and modifications can be made in the reaction conditions, reactants and the like without departing from the inventive concept. The metes and bounds of this invention can best be described by the claims which follow.

We claim:

1: A process for preparing 5 membered heterocyclic products of the formula:

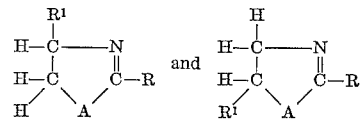

comprising the steps of contacting a carboxylic acid of the formula:

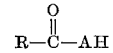

with an aziridinyl phosphine reactant of the formula:

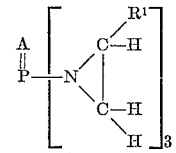

until a carboxylic acid adduct is formed, heating said adduct until the above-described products are formed, and isolating the products contained therein, R being selected from the group consisting of ethyl, propyl, isopropyl and phenyl radicals, $R^1$ being selected from the group consisting of hydrogen, methyl, cyclohexyl, phenyl and chlorinated phenyl radicals, and A being selected from the group consisting of sulfur and oxygen.

2. The process of claim 1 wherein the aziridinyl phosphine reactant is an aziridinyl phosphine oxide.

3. The process of claim 1 wherein the aziridinyl phosphine reactant is an aziridinyl phosphine sulfide.

4. A process for preparing 5 membered heterocyclic products of the formula:

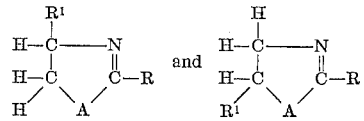

comprising the steps of contacting a carboxylic acid of the formula:

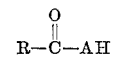

with an aziridinyl phosphine reactant of the formula:

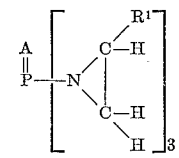

in the presence of inert solvent until a carboxylic acid adduct is formed, heating said adduct until the above-described products are formed, and isolating the products contained therein, R being selected from the group consisting of ethyl, propyl, isopropyl and phenyl radicals, $R^1$ being selected from the group consisting of hydrogen, methyl, cyclohexyl, phenyl and chlorinated phenyl radicals, and A being selected from the group consisting of sulfur and oxygen.

5. The process of claim 4 wherein the aziridinyl phosphine is an aziridinyl phosphine oxide.

6. The process of claim 4 wherein the aziridinyl phosphine is an aziridinyl phosphine sulfide.

No references cited.

ALEX MAZEL, *Primary Examiner.*

HENRY R. JILES, *Examiner.*

RICHARD J. GALLAGHER, *Assistant Examiner.*